Figure 1:
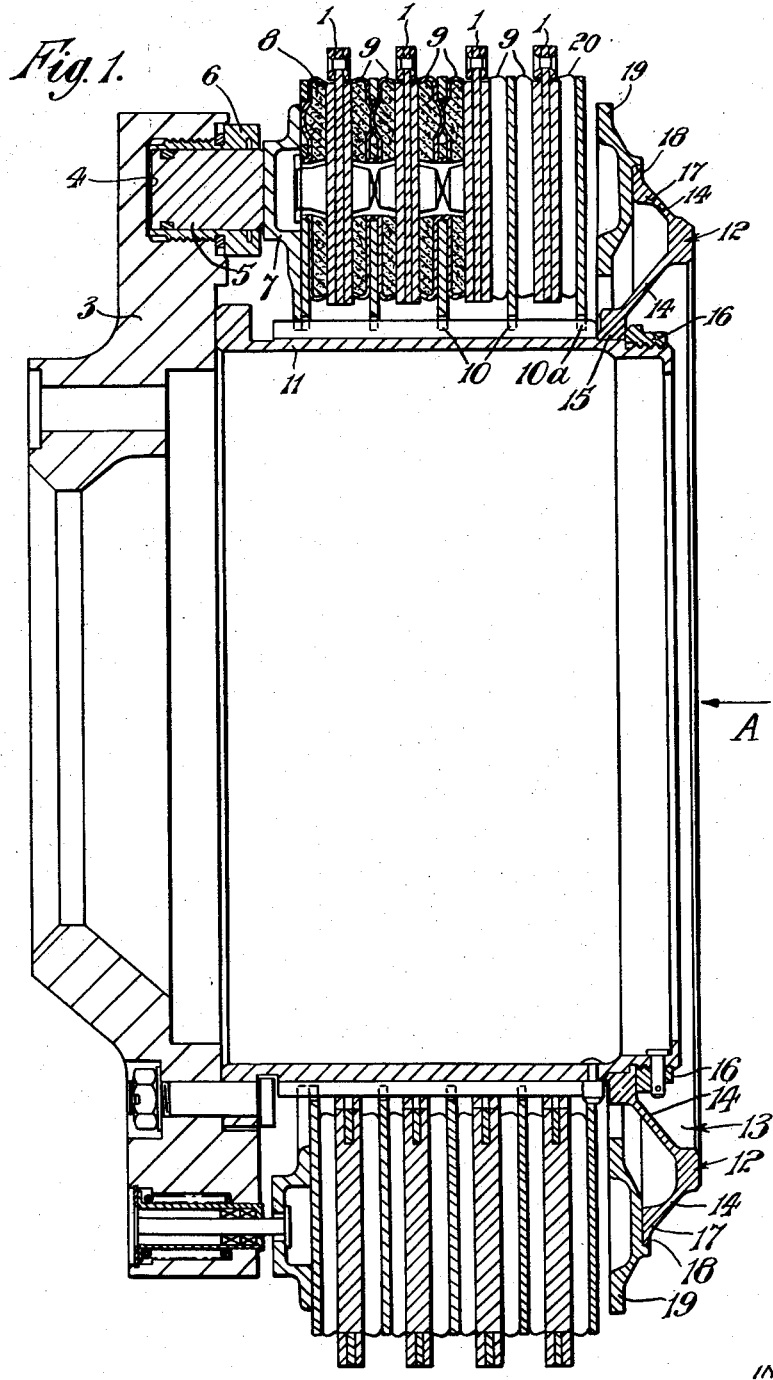

June 18, 1963   F. S. DOWELL   3,094,193
DISC BRAKES

Filed June 25, 1957   4 Sheets-Sheet 1

INVENTOR
Frederick Sidney Dowell
by Benj. T. Rauber
his attorney

INVENTOR
Frederick Sidney Dowell
by Benj. T. Rauber
his attorney

June 18, 1963  F. S. DOWELL  3,094,193
DISC BRAKES

Filed June 25, 1957  4 Sheets-Sheet 4

INVENTOR
Frederick Sidney Dowell
by Benj. T. Rauber
his attorney

United States Patent Office 3,094,193
Patented June 18, 1963

3,094,193
DISC BRAKES
Frederick Sidney Dowell, Coventry, England, assignor to Dunlop Rubber Company Limited, London County, England, a British company
Filed June 25, 1957, Ser. No. 667,756
Claims priority, application Great Britain June 26, 1956
12 Claims. (Cl. 188—72)

This invention relates to improvements in disc brakes for vehicles and more particularly relates to improvements in multi-disc brakes for aircraft.

Disc brakes for aircraft usually comprise one or more annular discs rotatable with a landing wheel, non-rotatable pads of friction material to frictionally engage the radially-extending sides thereof and a fluid-pressure operated mechanism or mechanisms to effect said engagement. It is usual to apply the operating pressure through pressure plates or the like which are located one on each side of the assembly of discs and pads, thereby squeezing the assembly between the pressure plates when the brake is applied. The brake may be of the "spot" type and comprise one or more pairs of friction pads axially-aligned on opposite sides of the disc and occupying only a minor portion of the braking surfaces thereof, or it may be of the type in which the pads extend circumferentially around the disc and cover substantially the entire area thereof.

The pressure plates, one on each side of the assembly of pads and discs, and through which the braking pressure is applied, have been found to deflect or bend axially outwardly at their outer periphery on applying braking pressure. This substantially reduces the area over which frictional engagement takes place, thus resulting in a lower brake efficiency. Whilst this could be cured to some extent by making the plates of thicker section the additional weight would be unacceptable, and the object of the present invention is to overcome this disadvantage without incurring a weight penalty.

According to the present invention a disc brake comprises an annular rotatable and axially-movable disc, a non-rotatable fluid-pressure operated mechanism adjacent one radially-extending side of said disc to force a pad of friction material against said side and to force said disc axially against a pad of friction material associated with a pressure plate on the other side of said disc, said pressure plate comprising a rigid pressure member carried by a flexible thrust receiving member receiving the thrust of the pressure operated mechanism at or adjacent a location axially in line with said fluid pressure operated mechanism, said thrust receiving member being associated with a non-rotatable portion of said brake.

The pressure member is preferably annular in shape and may be discrete from but secured to the thrust receiving member, or it may be integral therewith, the junction of said members being on a circle at or near the pad mean circle of pressure. The pressure member is of substantially annular disc shape to provide a flat non-distorting pressure surface for the brake pads. The thrust receiving member comprises a frusto-conical shell provided with a reinforcing ring at its inner boundary where it is secured to a non-rotatable part of the brake. If it is arranged to slope towards the pressure member, it may be integral or secured to the pressure member. If it is arranged to slope away from the pressure member it is connected through a spacer which may be in the form of a second frusto-conical shell, sloping towards the pressure member, or of a cylindrical shell. The spacer is integral with the inner frusto-conical shell, and a reinforcing ring is provided at the junction. The other end of the spacer may be integral with or secured to the pressure element. The design of the thrust receiving element is governed by the available space, having regard to considerations of adequate strength and rigidity and minimum weight. When the brake is applied the inner and outer boundaries of the thrust receiving member are loaded in opposition, so that a rolling moment is applied which will produce a slight rolling or tilting deflection to the section. There is substantially no transmission of this rolling deflection to the pressure member, due to flexing of the thin section of the thrust receiving member between its inner and outer peripheries. Where the two members are not integral, the self-aligning properties of the pressure member are assisted by slight relative angular movement at the joint. The pressure element will move axially with the axial deflection of the outer boundary of the thrust receiving element, but having substantially balanced loading on each face, it will be subject to negligible distortion, thus allowing full frictional engagement over the braking surfaces of the pads and disc.

Figure 2:
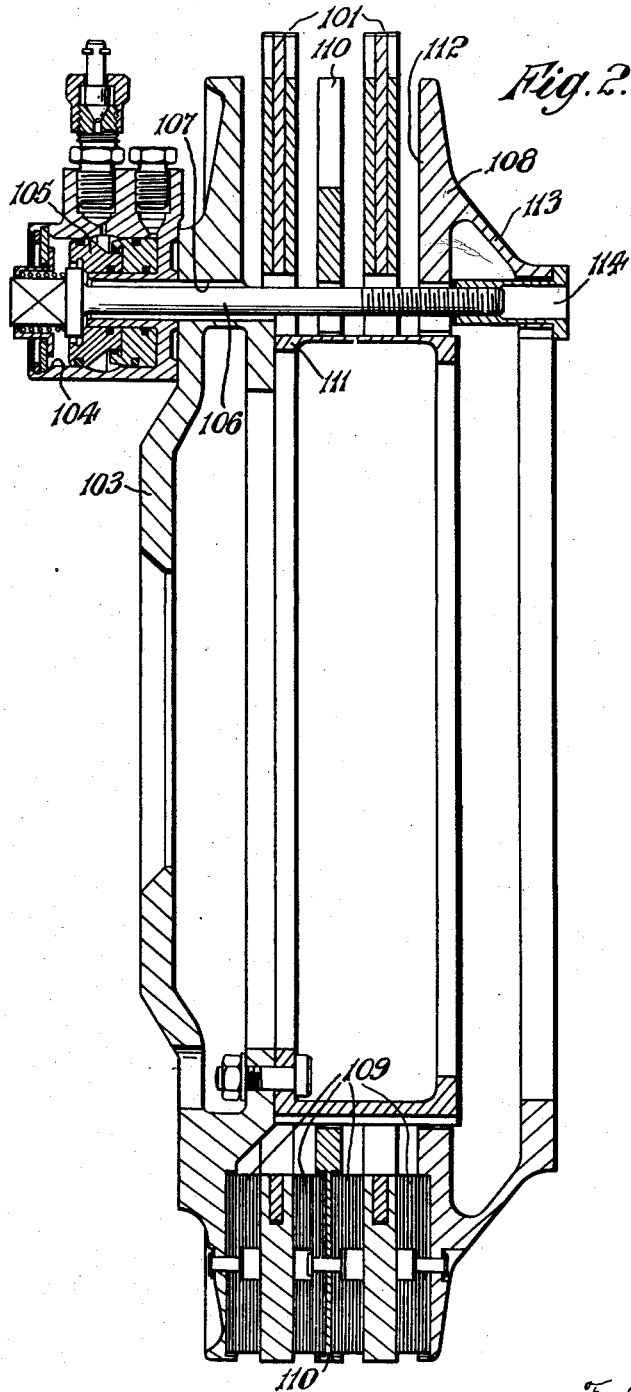
Figure 3:
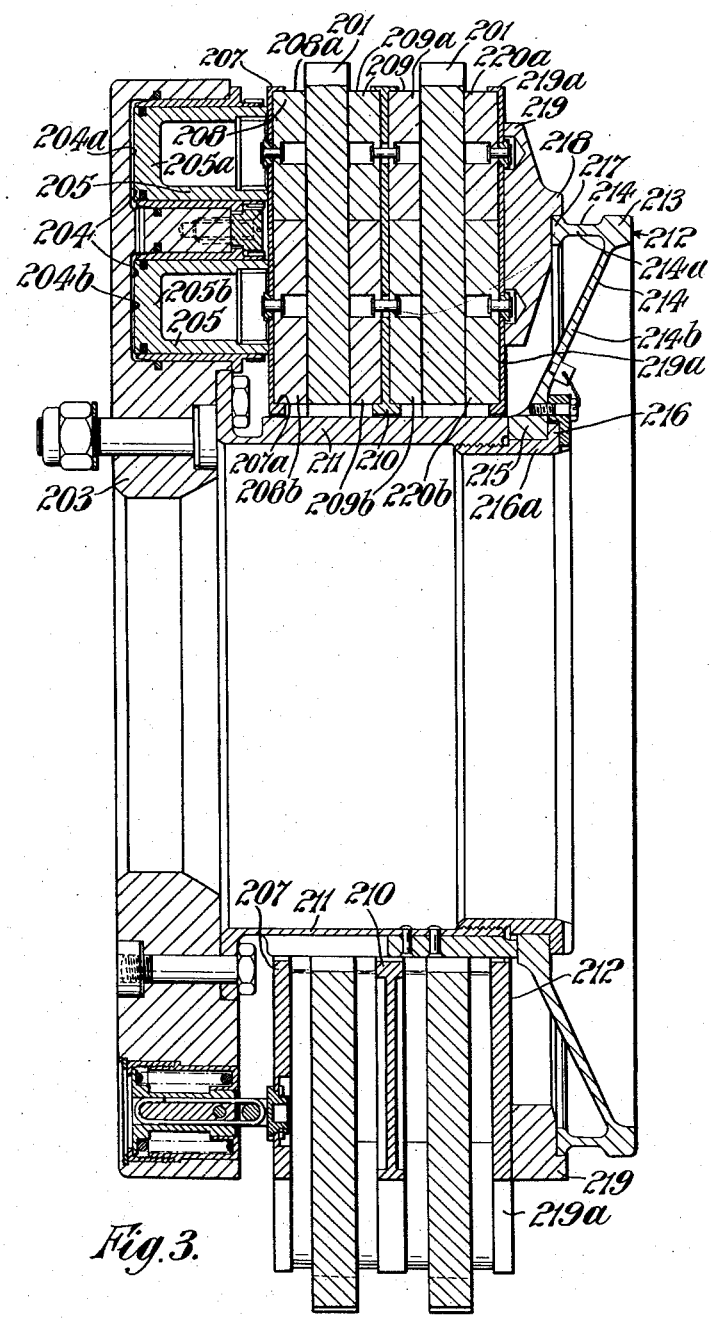
Figure 4:
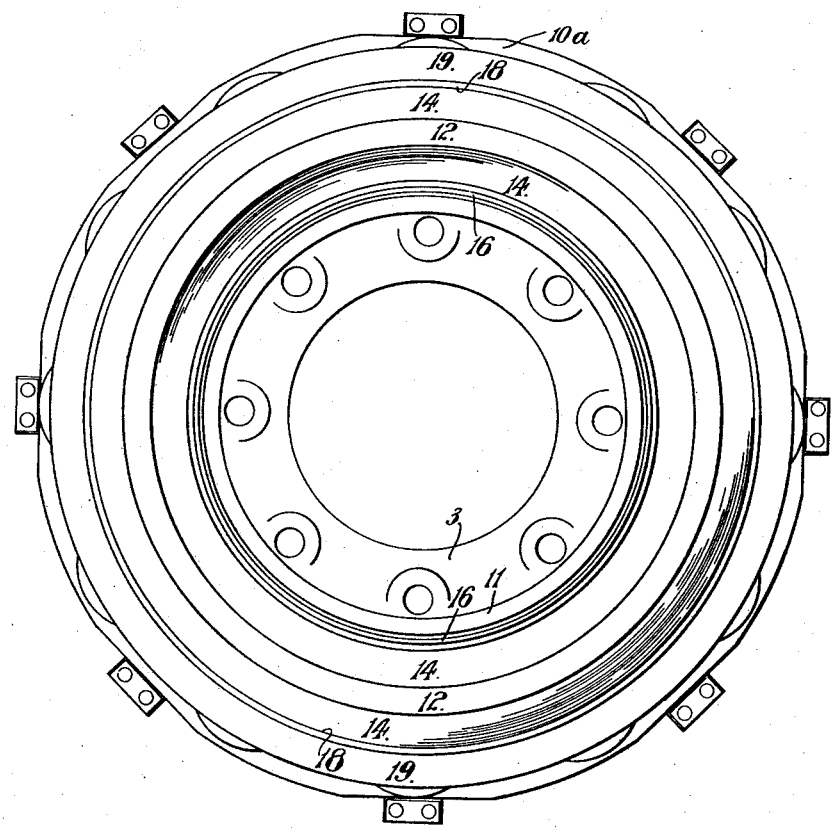

A better understanding of the invention may be obtained from the following description when it is read with reference to the accompanying drawings, of which:

FIGURES 1, 2 and 3 are sections through multiple disc brakes, each of which has a thrust receiving member constructed in accordance with different embodiments of the invention, and FIGURE 4 is a rear elevation of the brake shown in FIGURE 1, taken in the direction of the arrow "A" in that figure and showing the annular form of the thrust receiving member. The thrust receiving members of the other figures are substantially similar except as dictated by minor differences in design.

In the embodiment of the present invention shown in FIGURE 1, an aircraft multi-disc brake comprises four annular discs 1 axially slidable relative to the hub of an aircraft wheel and rotatable therewith. An annular torque member 3 is secured to a non-rotatable portion of the wheel assembly and is axially-aligned with the assembly of said discs 1 on the outer side thereof. Formed in said torque member is a plurality of circumferentially-spaced cylinders 4, the axes thereof being aligned with the discs substantially centrally of their inner and outer peripheries, and the open ends being presented towards the discs. A piston 5 is fluid-tightly slidable in each cylinder 4 and projects outwardly therefrom and the projecting ends 6 of the pistons are secured to an annular pressure plate 7.

Pads 8 of friction material are secured to the side of the pressure plate 7 remote from the torque member 3 to frictionally engage the adjacent braking surface of the nearest disc 1, and other friction pads 9 are secured to carrier plates 10 located between adjacent discs 1, said plates 10 being axially-slidable on a sleeve 11 which is secured to the torque member 3 and which extends axially adjacent the inner peripheries of the discs 1. Said pads 8, 9 are circumferentially-spaced around the pressure plate 7 and carrier plates 10.

A thrust receiving member 12 on the side of the assembly remote from the torque member 3 comprises an annular trough-shaped member 13 having comparatively thin and flexible walls 14, between its inner and outer peripheries, the open side of the trough being presented towards the discs 1. The inner peripheral portion of said member 13 is provided with a reinforcing ring 15 which abuts a stop 16 secured to the end of the sleeve 11 and the outer peripheral portion 17 engages in a recess 18 in the adjacent face of a radially-extending annular pressure transmitting member 19, the other side of the plate 19 having a radial face extending parallelly adjacent a carrier plate 10a having friction pads 20 secured thereto to engage the adjacent disc 1. The member 19 is suitably secured to the member 12 to ensure that the two parts do not become separated in operation, but the fastening means is sufficiently flexible to allow any required relative angular movement of the cross-sections. The centre of pressure of the member 19 is substantially axially-aligned with the centres of the piston and cylinder mechanisms 4, 5 and with the outer peripheral portion of said flexible member 13.

On applying the brake, by pressurizing the cylinders 4, the pistons 5 are forced outwardly thereof, and, acting through the adjacent pressure plate 7, force the assembly of discs 1 and pads 8, 9, 20 into frictional engagement against the ring 19 and the pressure plate 10a and thrust receiving member 13 at the other side of the assembly. The walls 14 of the trough-shaped thrust receiving member 13 deflect axially-outwardly under the load, but the outer peripheral section of the member 13 remains radially-aligned, even though it will be moved axially very slightly. Full frictional engagement is thus effected between the discs 1 and the pads 8, 9, 20 over the entire engaging area.

The thrust receiving member 12 and the pressure transmitting member 19 need not be separate but may be integral as in the embodiment shown in FIG. 2. In this embodiment an aircraft disc brake comprises a pair of axially slidable and rotatable discs 101, a torque member 103 secured to a non-rotatable part of the wheel assembly and circumferentially-spaced cylinders 104 secured to the torque member 103 on the side remote from the discs 101. A piston 105 is fluid-tightly slidable in each cylinder 104 and a rod 106 secured thereto extends axially through a passage 107 in the torque plate 103, adjacent the inner periphery of the discs 101 and is secured to a pressure plate and thrust receiving member 108 on the other side of the discs. Pads 109 of friction material are secured to the torque member 103, to the pressure plate 108 and to a carrier and thrust receiving member 110 between the discs 101 which is slidable on a sleeve 111, substantially in the manner described above.

The pressure plate and thrust receiving member 108 comprises an annular plate 112 provided integrally, on the side remote from the discs 101, with an inwardly-sloping frusto-conical thrust receiving member 113 of thinner section. The ends 114 of the piston rods 106 are secured to the end of the frusto-conical thrust receiving member 113 remote from the plate 112. The frusto-conical portion 113 intersects the median surface of the plate 112 at the centre of pressure of the plate 112, i.e. the junction of the two portions 112 and 113 lies substantially on the centre of pressure of the plate 112, so that, on applying the brake by pressurizing the cylinder 104 to draw the pressure plate 112 towards the torque plate 103 the frusto-conical member 113 will flex whilst the plate 112 itself remains radially-aligned to enable full frictional engagement to be maintained.

In still a further embodiment of the invention, as shown in FIGURE 3 of the drawings, an aircraft brake comprises a pair of axially-slidable and rotatable discs 201, a torque member 203 secured to a non-rotatable part of the wheel assembly and circumferentially spaced cylinders 204 formed in the torque member 203 on the side remote from the discs 201. A piston 205 is fluid-tightly slidable in each cylinder 204 and projects outwardly therefrom, the protruding ends of the pistons being secured to an annular pressure plate 207.

Pads 208 of friction material are secured in recesses 207a in the pressure plate 207 on the side thereof remote from the torque member 203 and are adapted frictionally to engage the adjacent radial surface of the adjacent disc 201 upon actuation of the piston and cylinder mechanisms 204, 205. Other friction pads 209 are secured in recesses on opposite sides of an intermediate pressure plate 210 between the discs 201, said plates 207 and 210 being axially-slidable on a sleeve 211 which is secured to the torque member 203 and which extends axially adjacent the inner peripheries of the discs 210. The pads 208 and 209 are circumferentially spaced around the plates 207 and 210 and are axially-aligned with the pistons 205. Preferably, as shown in FIGURE 2, the circumferentially-spaced cylinders 204, pistons 205 and pads 207, 209 are arranged in radially aligned pairs 204a, 204b; 205a, 205b; 207a, 207b; and 209a, 209b.

The thrust receiving member 212 on the side of the assembly remote from the torque member 203 comprises an annular trough-shaped member 213 having comparatively thin and flexible walls 214, the wall 214a being cylindrical in form and the wall 214b defining a frusto-conical annulus having its widest circumference directed away from the discs 201. The inner peripheral portion of the wall 215b is provided with a reinforcing ring 215 and abuts a stop 216 formed in an annular ring 216a which is screw-threadedly engaged in the adjacent end of the sleeve 211. The axially-inner end of the cylindrical wall 214a of the member 213 is also formed with a reinforcing ring 217 which engages with an annular abutment 218 in the side of a radially extending annular pressure plate 219, to which is secured a carrier plate 219a having friction pads 220a, 220b secured thereto. The ring 217 is loosely secured to the plate 219, and relative angular movement therebetween is possible as in the previously described embodiments, the centre of pressure of the plate 219 being substantially axially-aligned with the mean centre of pressure of the radially- and circumferentially-spaced piston and cylinder mechanisms 204, 205 and with the outer periphery of the member 213.

On applying the brake by pressurising the cylinders 204, the pistons 205 are forced outwardly thereof and, acting through the adjacent pressure plate 207, force the assembly of discs 201 and pads 208, 209, 220a and 220b into frictional engagement against the thrust receiving member 212 at the other side of the assembly. The wall 214b of the trough-shaped member 213 deflects axially-outwardly under the load but the section of the member 213 remains radially-aligned even though it will be moved axially very slightly. Full frictional engagement is thus effected between the discs 201 and the pads 208, 209, 220a and 220b.

Generally speaking, as will be observed from the above description, the operation of the embodiments of FIGURES 1 and 3 is substantially the same, the essential difference therebetween being the form of the thrust receiving members 12 and 212.

With minor modifications, which will readily be apparent to those skilled in the art, the thrust receiving members 12, 112 and 212 may readily be adapted to be interchanged with the respective thrust receiving members actually illustrated in association with the brake shown in the respective drawings and are readily adaptable to be used either in brakes wherein the discs and friction pads are progressively gathered together and forced against an axially-outer pressure plate or are gathered together from each end of the assembly and pressed against each other at an axially-central location.

The braking mechanism per se, therefore, should not be regarded as being an essential feature of the invention, the particular assemblies shown in the drawings being illustrative, only, of the manner in which the invention is applied.

Further the front pressure plates of any of the brakes described may also be constructed in the same manner as the back pressure plates herein described.

The pressure plates need not be annular in shape but may comprise, e.g. beams extending diametrically across the discs.

Having now described my invention what I claim is:

1. A disc brake comprising a rotatable disc slidable axially on a rotatable member to be braked, a non-rotatable friction member adjacent to one radial side of said rotatable disc, means for applying braking pressure to said friction member, a non-rotatable rigid annular pressure transmitting element opposed to the other radial side of said disc, an annular carrier plate between said pressure transmitting element and said rotatable disc and having a plane surface facing and parallel to the radial side of said disc, a friction pad secured to the face of said carrier plate opposed to said disc, and an annular thrust receiving member to be secured at its inner periphery to a fixed part of said brake and at its outer periphery engaging said annular pressure transmitting element on a circle coinciding substantially with a circle of pressure developed by engagement of said friction member and said friction pad with said rotating disc, the portion of said thrust receiving member at said outer periphery being substantially rigid and the portion between the outer and inner peripheries of said thrust receiving member being sufficiently flexible to yield between these peripheries under the thrust of the brake applying force to permit the outer peripheral portion of said thrust receiving member and said annular pressure transmitting element supported thereby to adjust to parallelism with the opposed face of said disc under force received from said disc upon the application of said brakes.

2. The brake of claim 1 wherein said pressure transmitting element is detachably secured to said thrust receiving member.

3. The brake of claim 1 wherein said pressure transmitting element is integral with said thrust receiving member.

4. The brake of claim 1 wherein the portion of said thrust receiving member between the outer and inner peripheries of said thrust receiving member comprises an inner frusto-conical portion sloping in a direction outwardly from its inner periphery and away from said pressure transmitting element and an outer frusto-conical portion extending from said inner frusto-conical portion in a slope reverse to that of said inner frusto-conical member to a supporting contact with said annular pressure transmitting element.

5. The brake of claim 1 comprising a plurality of said rotatable discs and friction pads between said means for applying braking pressure and said pressure transmitting element, and an annular non-rotatable carrier plate axially slidable between each adjacent pair of said discs, each said carrier plate having friction pads disposed on opposite radial faces thereof.

6. The brake of claim 1 wherein the portion of said thrust receiving member between said inner and said outer peripheries comprises a frustro-conical shell having an annular reinforcement at its inner periphery.

7. The brake of claim 6 wherein said frusto-conical portion slopes radially and axially outwardly away from said pressure transmitting element and comprises a cylindrical portion integral with said frusto-conical portion and extending axially inwardly therefrom to said pressure transmitting element.

8. The brake of claim 6 wherein said frusto-conical portion comprises an annular portion of reduced thickness to flex angularly to the axis of said brake under unequally distributed brake applying stresses.

9. The disc brake of claim 1 wherein said means for applying braking pressure is a fluid pressure operated mechanism.

10. The disc brake of claim 4 wherein each said fluid pressure operated mechanism comprises a cylinder and piston.

11. The disc brake of claim 1 wherein said thrust receiving member comprises a shell having an annular reinforcement at its inner periphery, said shell comprising a frusto-conical inner portion sloping radially and axially outwardly, and an outer frusto-conical portion sloping reversely from said inner portion to the outer periphery of said thrust receiving member supporting said pressure transmitting element.

12. The disc brake of claim 11 having an annular integral reinforcement at the junction of said inner frusto-conical portion and said outer frusto-conical portion of said shell.

References Cited in the file of this patent
UNITED STATES PATENTS

| | | |
|---|---|---|
| 1,958,070 | Schmid et al. | May 8, 1934 |
| 1,977,981 | Bates | Oct. 23, 1934 |
| 2,002,990 | White | May 28, 1935 |
| 2,020,667 | Wahl | Nov. 12, 1935 |
| 2,102,406 | Cohen | Dec. 14, 1937 |
| 2,371,158 | Eby | Mar. 13, 1945 |
| 2,429,702 | Thompson | Oct. 28, 1947 |
| 2,578,308 | Iavelli | Dec. 11, 1951 |
| 2,642,959 | Freer | June 23, 1953 |
| 2,888,103 | Armstrong | May 26, 1959 |